United States Patent
Elliott et al.

(10) Patent No.: US 8,241,605 B2
(45) Date of Patent: Aug. 14, 2012

(54) METHODS AND APPARATUS FOR CATALYTIC HYDROTHERMAL GASIFICATION OF BIOMASS

(75) Inventors: Douglas C. Elliott, Richland, WA (US); Robert Scott Butner, Richland, WA (US); Gary G. Neuenschwander, Burbank, WA (US); Alan H. Zacher, Pasco, WA (US); Todd R. Hart, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 271 days.

(21) Appl. No.: 12/339,876

(22) Filed: Dec. 19, 2008

(65) Prior Publication Data

US 2010/0154305 A1 Jun. 24, 2010

Related U.S. Application Data

(60) Provisional application No. 61/024,970, filed on Jan. 31, 2008.

(51) Int. Cl.
*C01B 3/24* (2006.01)
*C01B 3/02* (2006.01)
(52) U.S. Cl. .................... 423/650; 650/648.1
(58) Field of Classification Search ............... 423/650
See application file for complete search history.

(56) References Cited

U.S. PATENT DOCUMENTS

| | | | |
|---|---|---|---|
| 4,113,446 A | 9/1978 | Modell et al. | |
| 4,638,629 A * | 1/1987 | Archer et al. | 60/775 |
| 4,657,681 A | 4/1987 | Hughes | |
| 5,630,854 A * | 5/1997 | Sealock et al. | 48/127.7 |
| 2007/0000177 A1 * | 1/2007 | Hippo et al. | 48/210 |
| 2007/0204620 A1 * | 9/2007 | Pronske et al. | 60/671 |
| 2009/0126274 A1 * | 5/2009 | Vogel et al. | 48/127.7 |

FOREIGN PATENT DOCUMENTS

| | | |
|---|---|---|
| EP | 1772202 A1 | 4/2007 |
| JP | 2003013077 A | 1/2003 |

(Continued)

OTHER PUBLICATIONS

Elliott, Douglas C.; Hart, Todd R.; Neuenschwander, Gary G.; "Catalytic Hydrothermal Gasification of Biomass for the Production of Hydrogen-Containing Feedstock (Methane)", 2nd Symposium on Hydrogen from Renewable Sources and Refinery Applications, Prep. Pap.-Am. Chem. Soc., Div. Pet. Chem. 53 (1), 73-74 pps., 2008.

(Continued)

*Primary Examiner* — Melvin C Mayes
*Assistant Examiner* — Kenneth Vaden
(74) *Attorney, Agent, or Firm* — Allan C. Tuan

(57) ABSTRACT

Continuous processing of wet biomass feedstock by catalytic hydrothermal gasification must address catalyst fouling and poisoning. One solution can involve heating the wet biomass with a heating unit to a temperature sufficient for organic constituents in the feedstock to decompose, for precipitates of inorganic wastes to form, for preheating the wet feedstock in preparation for subsequent separation of sulfur contaminants, or combinations thereof. Treatment further includes separating the precipitates out of the wet feedstock, removing sulfur contaminants, or both using a solids separation unit and a sulfur separation unit, respectively. Having removed much of the inorganic wastes and the sulfur that can cause poisoning and fouling, the wet biomass feedstock can be exposed to the heterogeneous catalyst for gasification.

10 Claims, 1 Drawing Sheet

FOREIGN PATENT DOCUMENTS

WO 9630464 A1 10/1996

OTHER PUBLICATIONS

Elliott, D.C.; Sealock, L.J., Jr.; "Chemical Processing in High-Pressure Aqueous Environments: Low Temperature Catalytic Gasification", Trans IChemE, Part A, vol. 74, No. A5, Institution of Chemical Engineers, Jul. 1996, 563-566 pps.

Elliott, Douglas C., "Catalytic Hydrothermal Gasification of Biomass", Biofuels, Bioproducts, and Biorefining, 2:254-265, web publication, Apr. 14, 2008.

Peterson, Andrew A.; Vogel, Frederic; Lachance, Russel P.; Froling, Morgan; Antal, Michael J. Jr.; Tester, Jefferson W., "Thermochemical biofuel production in hydrothermal media: A review of sub- and supercritical water technologies", Energy & Environmental Science, vol. 1, 32-65 pps., Jun. 24, 2008.

Elliott, D.C.; Baker, E.G.; Sealock, L.J., Jr.; Neuenschwander, G. G.; Butner, R.S.; "Low Temperature Conversion of High-Moisture Biomass Continuous Reactor System Results", Biofuels and Municipal Waste Technology Division, Pacific Northwest Laboratory, Richland, Washington, 80 pages, 1989.

Elliott, D.C.; Phelps, M.R.; Sealock, John, Jr.; Baker, Eddie G.; "Chemical Processing in High-Pressure Aqueous Environments. 4. Continuous-Flow Reactor Process Development Experiments for Organics Destruction", Industrial and Engineering Chemistry Research, 1994, 33, American Chemical Society, Washington, D.C., USA.

Elliott, Douglas C.; Neuenschwander, Gary G.; Hart, Todd R.; "Chemical Processing in High-Pressure Aqueous Environments. 7. Process Development for Catalytic Gasification of Wet Biomass Feedstocks", Industrial and Engineering Research, 2004, 43, American Chemical Society, Washington, D.C., USA.

Overend, R.P.; Milne, T.A.; Mudge, L.K.; "Gasification and Liquefaction of Forest Products in Supercritical Water:" Fundamentals of Thermochemical Biomass Conversion, 1985, 95-120 pps., Elsevier Applied Science Publishers, London and New York, USA.

Kruse, A.; Henningsen T.; SNA, A.; Pfeiffer, J.; "Biomass Gasification in Supercritical Water: Influence of the Dry Matter Content and the Formation of Phenols", Industrial & Engineering Chemistry Research, 2003, 3711-3717 pps., vol. 42, American Chemical Society, Washington, D.C., USA.

International Search Report/Written Opinion, dated Dec. 7, 2009.

Matsumura, Yukihiko, et al., Biomass gasification in near- and super-critical water: Status and prospects, Biomass & Bioenergy, Jun. 21, 2005, 269-292 pps., vol. 29, Elsevier, Honolulu, Hawaii, USA.

Osada, Mitsumasa, et al., Subcritical Water Regeneration of Supported Ruthenium Catalyst Poisoned by Sulfur, Energy & Fuels, Jan. 11, 2008, 845-849 pps., vol. 22, American Chemical Society.

Anonymous, Report on Investigation of Energy Conversion Technology for Waste Materials using Supercritical Water, Internet Article, Mar. 2003, 1-93 pps., XP002554604. Retrieved from Internet: URL:http://www.tech.nedo.go.jp/PDF/100002645.pdf.

* cited by examiner

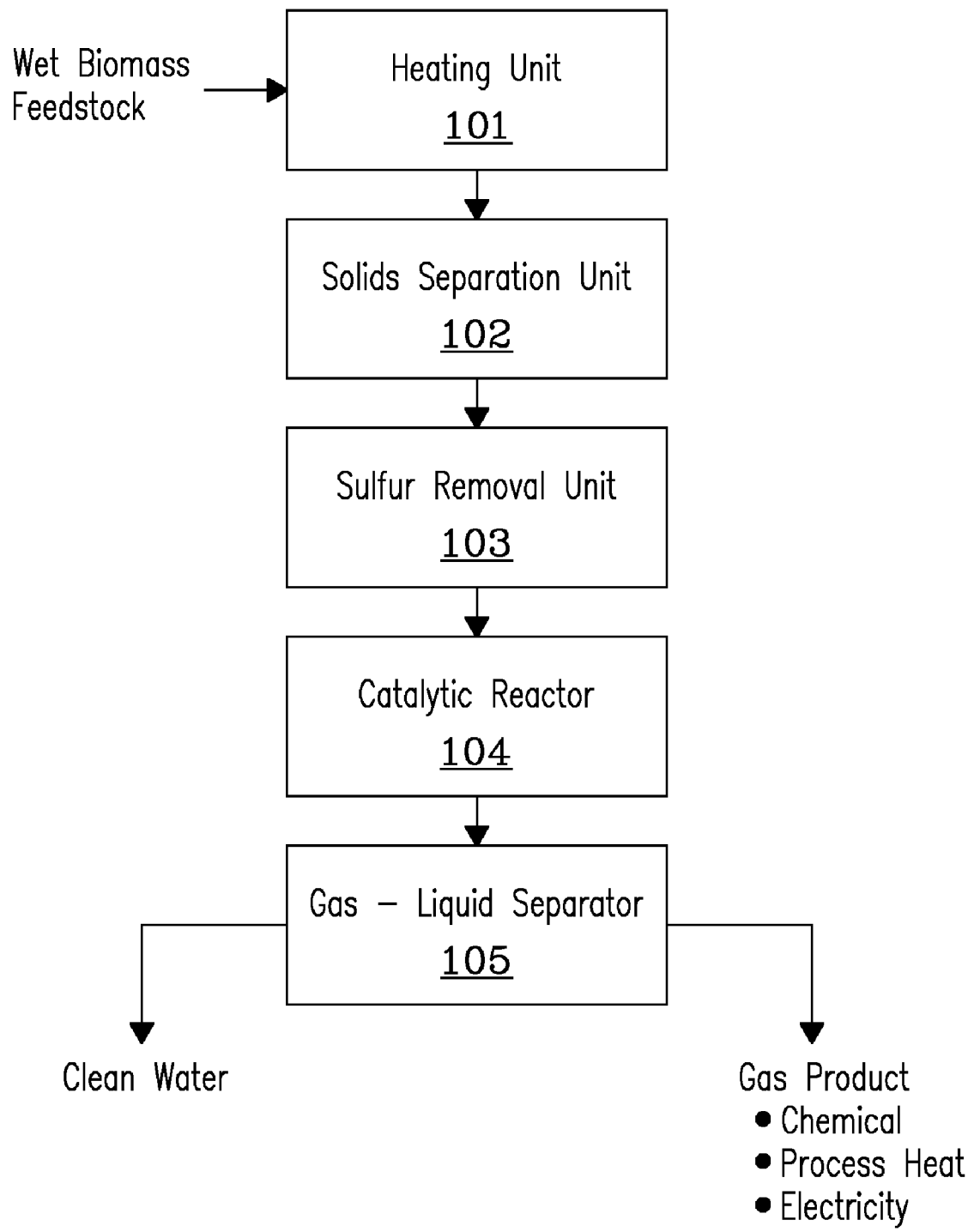

METHODS AND APPARATUS FOR CATALYTIC HYDROTHERMAL GASIFICATION OF BIOMASS

PRIORITY

This invention claims priority from U.S. Provisional Patent Application 61/024,970 filed Jan. 31, 2008, which application is incorporated herein by reference.

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

Gasification of biomass by thermal methods involving pyrolysis and/or partial oxidation is known as a method to produce a synthesis gas, composed of carbon oxides and hydrogen, or a fuel gas. Many of the known methods use a dry biomass feedstock with less than 10 wt % moisture. However, much of the biomass resource contains higher levels of moisture, more typically 50 wt % and some even consist of wet biomass, or biomass in water slurries at 85 wt % moisture or higher. One approach to efficiently process such wet biomass is gasification employing an active catalyst in a pressurized water environment (e.g., hydrothermal gasification).

However, when treating wet biomass by hydrothermal gasification, constituents that are commonly inherent in the feedstock can poison and/or foul the catalyst making long-term and/or continuous operation difficult to achieve. Accordingly, a need for apparatuses and methods for hydrothermal gasification of wet biomass exist.

SUMMARY

The present invention includes apparatuses and methods for treating wet biomass by catalytic hydrothermal gasification that address the problem of poisoning and fouling of the catalyst, especially for long-term and/or continuous use. Unexpectedly, the inorganic wastes that precipitate in the catalyst and cause plugging and poisoning can be precipitated by heating the wet biomass feedstock prior to exposure to the catalyst. Accordingly, treatment of the wet biomass feedstock comprises heating the wet biomass with a heating unit to a temperature sufficient for organic constituents in the feedstock to decompose, for precipitates of inorganic wastes to form, for preheating the wet feedstock in preparation for subsequent separation of sulfur contaminants, or combinations thereof. Treatment further comprises separating the precipitates out of the wet feedstock, removing sulfur contaminants, or both using a solids separation unit and a sulfur separation unit, respectively. Having removed much of the inorganic wastes and the sulfur that can cause poisoning and fouling, the wet biomass feedstock can be exposed to the heterogeneous catalyst for gasification.

As used herein, biomass refers to biological material that can be used for fuel or for industrial production. Exemplary biomass can include, but is not limited to, biosludge from wastewater treatment facilities, sewage sludge from municipal treatment systems, wet byproducts from biorefinery operations, wet byproducts/residues from food processing, animal waste and waste from centralized animal raising facilities, organic chemical manufacturing wastewater streams, and industrial wastewater containing organics. Biomass commonly comprises organic matter that can be treated in a continuous reactor, according to embodiments of the present invention, to yield a gas containing hydrogen or useful for hydrogen production (e.g., methane). Common inorganic contaminants, which can poison and/or foul the catalyst, can include, but are not limited to minerals comprising Ca, Mg, P, and/or Fe.

In preferred embodiments, the heterogeneous catalysts comprise Ru, Ni, and/or Ni with added Na. The Na can be in the form of a sodium carbonate co-catalyst. In a particular embodiment, the catalyst comprises Ru on a carbon support. Furthermore, the catalyst can be configured to gasify the organic constituents into a hydrogen-containing feedstock for subsequent catalytic reformation.

Separation of solids from the heated wet biomass feedstock can be achieved using a solids separation unit, which can include, but is not limited to, a gravity separation unit, a hydrocyclonic separation unit, and/or a filtration unit. Removal of sulfur can be achieved using a sulfur separation unit comprising, for example, an adsorbent bed with a metal or metal oxide.

Preferably, the catalytic hydrothermal gasification occurs at conditions in which water is below its critical point (i.e., sub-critical). In a particular embodiment, the wet biomass feedstock is heated to at least 300° C. In another embodiment, a catalytic reactor containing the heterogeneous catalyst is heated to a temperature between 250° C. and 374° C. The pressure in the catalytic reactor can be up to 23 MPa. In a preferred embodiment the catalytic reactor is operated at temperatures between 340° C. and 360° C. and pressures between 18 MPa and 21 MPa.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

FIG. 1 is a diagram depicting system for hydrothermal gasification of biomass according to one embodiment of the present invention.

DETAILED DESCRIPTION

The following description includes the preferred best mode of one embodiment of the present invention. It will be clear from this description of the invention that the invention is not limited to these illustrated embodiments, but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

The wet biomass feedstock typically comprises at least two types of solids that can clog, plug, and/or poison the catalyst including organic matter and mineral materials. According to embodiments of the present invention, proper preheating of the biomass feedstock can transform the solid organic matter to liquid and/or gas, both of which can pass into the catalytic reactor without causing plugging and/or poisoning. Furthermore, there is little solid char formation. In the prior art, char can be a major product at sub-critical conditions. The present invention also calls for sub-critical operating conditions and provides approaches for the minerals to be precipitated and separated from the stream while allowing the liquefied biomass organics to pass on to the catalytic reactor. With the solids separated, a sulfur scrubber bed could also be used without plugging, as well as the catalytic bed for gasification.

Initial continuous flow experiments of hydrothermal gasification of biomass utilizing nickel catalysts in a Carberry-type stirred tank reactor confirmed that high conversion of biomass solids to gas can be achieved with high concentrations of methane in the product gas using a number of wet biomass feedstocks, such as sorghum, spent grain and cheese whey. However, also seen in these tests was the rapid deactivation of the nickel catalysts. Decomposition of the nickel catalyst and poisoning by mineral content in the feedstocks were suspected deactivation mechanisms.

Additional testing was performed in a tubular reactor with a fixed bed of catalyst. In the test, brewer's spent grain biomass (28,500-41,000 ppm COD) was processed. A more stable nickel catalyst was used and was effective (97.7% COD reduction @ 2.3 LHSV) but lost activity (71.2% COD reduction @ 2.0 LHSV) after several hours. Analysis of the catalyst showed deposits of biomass-derived minerals on the catalyst such as hydroxylapatite ($Ca_5(PO_4)_3OH$) and nickel subsulfide ($Ni_3S_2$).

In a related test, a stirred tank preheater was placed upstream of the tubular catalytic reactor. In this test, using a more concentrated stream of spent grain (61,500-65,000 ppm COD), a less definitive deactivation (initially 96.2% @1.3 LHSV reduced to 82.2% @ 1.7 LHSV) was noted. Following the test, in addition to catalyst coating, there was also a deposit in the preheater composed of hydroxylapatite and nickel subsulfide, but also iron phosphate, ammonium iron sulfate, potassium aluminosilicate, calcium carbonate, calcium magnesium sulfate, and anorthoclase, an alkali silicoaluminate. All of these precipitates were attributed to components in the biomass feedstock. Furthermore, in tubular-reactor-only configurations, biomass slurry pumping difficulties became evident. Processing of slurries of ground potato or apple peels were short-lived because of pump failures and plugging of solids at the front end of the catalytic bed. The plugging appeared to be primarily organic solids produced from partially pyrolyzed biomass. These short-lived tests verified the high activity (95.4% COD reduction @ 2.67 LHSV) of the ruthenium stabilized nickel catalyst for biomass gasification.

With the use of a stirred tank preheater, the initial pyrolysis of biomass solids was achieved and effective gasification could be demonstrated at the bench-scale and in a scaled-up engineering demonstration unit. In a scaled-up reactor, the use of either a stirred tank preheater or a tube-in-tube heat exchanger was sufficient to liquefy the biomass solids prior to entering the catalyst bed. However, mineral precipitates from the biomass remained as a significant problem leading to plugging at the front end of the catalyst bed. Deposits composed of magnesium, phosphorus, and calcium were observed. An additional catalyst deactivation problem was also clearly identified by x-ray photometric spectrometry analysis showing sulfur highly associated with the metal in the catalyst.

The results of the tests described above indicate that organic solids, which are a source of plugging in the catalyst bed can be liquefied and/or eliminated by heating the feedstock. Unexpectedly, heating of the feedstock can also concurrently cause precipitation of inorganic material that might otherwise deactivate the catalyst by plugging and/or poisoning.

The problem of mineral and organic deposits when processing biomass can be addressed through heating the feedstock and capturing inorganic solids according to embodiments of the present invention. Referring to FIG. 1, one such embodiment is depicted in which a continuous-flow reactor system comprises a wet biomass feedstock heater, a sulfur removal unit, a solids separation unit, and a catalytic reactor.

One particular system similar to the one illustrated in FIG. 1 was based on a throughput of 0.5-10 lb of slurry or solution per hour and was typically operated over a range of 1 to 3 liter/hour. These operating parameters are not to be construed as limitations to the present invention, but are rather descriptive by way of example. Slurry feeding to the pressurized system was accomplished using a syringe pump having a large-bore valve package that controls the feeding from one cylinder or the other. The valve package comprised four ⅜-inch air-actuated (6000 psi rated) ball valves with ⅜-inch stainless steel (SS) tubing connections. Oversize caps were installed on the barrels that accommodate ⅜-inch NPT fittings. The large bore head, valve, and tubing allowed suctioning and pumping of the viscous slurries while still allowing the pump to operate at 3500 psi max. All valves and valve trim (except the pressure-control valve) were made of SS. The feeding rates were measured directly by the screw drive of the positive displacement syringe pump.

The preheater was a 1-liter 316 SS vessel that functioned as a continuous-flow, stirred-tank reactor in which the feedstock was brought to the reaction temperature. In the process of heat up, the organics in the biomass were pyrolyzed and liquefied while inorganic components, such as calcium phosphates, formed and precipitated as solids.

The catalytic reactor was constructed of 304 SS and had an inner diameter of one inch with a length of 72 inches. The reactor had bolted-closure endcaps with metal o-rings on each end. Catalyst pellets were supported in the reactor on a circle of fine screen. The reactor furnace was a 6-kWe resistance heater split into three separately controllable zones. The pressure was controlled with a dome-loaded diaphragm back-pressure regulator.

A solid separations unit was placed in the process line between the preheater and the reactor to capture and remove the solids before they reached the catalyst bed, where, in previous tests, they have collected and caused flow plugging.

A sulfur scrubber trap incorporated a chemical trap for reduced sulfur forms. The sulfur components reacted with the trap material to form insoluble sulfide, which prevented their passing into the catalyst bed where they could react with the metal of the catalyst and destroy its catalytic capability.

Using the continuous-flow reactor system described above, tests were completed with stillage from corn ethanol production and with insoluble solids following starch extraction from wheat millfeed (wheat flour byproduct). A ran of at least 10 hours was completed with the stillage and ended when the feedstock was exhausted. The liquid hourly space velocity was 1.5 L/L/hr and the conversion of chemical oxygen demand (COD) was 99.7 to 99.9% throughout the test. Gas yield was 0.84 L/g dry solids with a composition of 57% methane, 41% carbon dioxide and 2% hydrogen. Other hydrocarbon gas products amounted to less than 1% and the carbon monoxide was undetectable at less than 100 ppm. The mineral recovery system recovered a solid with 91% ash content and which accounted for less than 1% of the carbon in the feedstock. Phosphate in the feedstock at about 2700 ppm was found to be absent, <1 ppm, following the processing.

A 9.5-hour run was completed with the solids from wheat millfeed which had the starch extracted from it. The test was ended when the catalyst was showing significant deactivation. The liquid hourly space velocity was 1.5 L/L/hr and the conversion of COD was 99.9% through most of the test. Gas yield was 0.80 L/g dry solids with a composition of 56% methane, 42% carbon dioxide and 2% hydrogen. Other hydrocarbon gas products amounted to less than 1% and the carbon monoxide was undetectable at less than 100 ppm. The mineral recovery system recovered a solid with 70 to 80% ash content and which accounted for 1 to 2% of the carbon in the feedstock. Phosphate in the feedstock at about 940 ppm was found to be absent, <1 ppm, following the processing. Sulfate was also present in the feed at 35 ppm but was found in the range of 2 to 10 ppm in the effluent.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A catalytic hydrothermal process characterized by:
   heating under pressure a wet biomass feedstock to a temperature sufficient for organic constituents in the feedstock to decompose, for precipitates of inorganic wastes to form, and for preheating the wet feedstock in preparation for subsequent separation of sulfur contaminants, the temperature and pressure less than the critical temperature and pressure of water;
   separating the precipitates out of the wet feedstock, removing sulfur contaminants from the wet biomass feedstock, at a temperature and pressure less than the critical temperature and pressure of water; and
   exposing the wet biomass feedstock to a heterogeneous metal catalyst and gasifying at least a portion of the organic constituents after said separating, said exposing occurs at temperatures and pressures below the critical point of water;
   wherein the process is operated in continuous mode and wherein water in the feedstock is in a liquid phase during said heating, separating, and exposing steps.

2. The process of claim 1, wherein the heating comprises heating the wet biomass feedstock to at least 300° C.

3. The process of claim 1, wherein the separating the precipitates comprises an operation selected from the group consisting of gravity separation, hydrocyclonic separation, filtration, or combinations thereof.

4. The process of claim 1, wherein the heterogeneous metal catalyst comprises Ru, Ni, or Ni with added Na.

5. The process of claim 1, wherein the heterogeneous catalyst comprises Ru on a carbon support.

6. The process of claim 1, wherein the removing sulfur contaminants comprises capturing sulfur contaminants in an adsorbent bed by reaction with a metal or a metal oxide.

7. The process of claim 1, wherein the wet feedstock is selected from the group consisting of high-moisture biomass slurries, biosludge from wastewater treatment systems, sewage sludge from municipal treatment systems, wet byproducts from biorefinery operations, wet byproducts/residues from food processing, animal waste and waste from centralized animal raising facilities, organic chemical manufacturing wastewater streams, industrial wastewater contaminated with organics, and combinations thereof.

8. The process of claim 1, wherein the exposing occurs at 340-360° C. and 18-21 MPa.

9. The process of claim 1, wherein said gasifying of the organic constituents yields a hydrogen-containing feedstock for catalytic reformation.

10. A catalytic hydrothermal process characterized by:
    heating under pressure a wet biomass feedstock to a temperature sufficient for organic constituents in the feedstock to decompose, for precipitates of inorganic wastes to form, and for preheating the wet feedstock in preparation for subsequent separation of sulfur contaminants;
    separating the precipitates out of the wet feedstock, removing sulfur contaminants from the wet biomass feedstock; and
    exposing the wet biomass feedstock to a heterogeneous metal catalyst and gasifying at least a portion of the organic constituents after said separating, said exposing occurs at temperatures and pressures below the critical point of water;
    wherein the process is operated in continuous mode and wherein water in the feedstock is in a liquid phase at a temperature less than or equal to 360° C. during said heating, separating, and exposing steps.

* * * * *